US 12,103,398 B2

(12) United States Patent
Gitt et al.

(10) Patent No.: US 12,103,398 B2
(45) Date of Patent: Oct. 1, 2024

(54) HYBRID DRIVE SYSTEM FOR A MOTOR VEHICLE, AND MOTOR VEHICLE

(71) Applicant: MERCEDES-BENZ GROUP AG, Stuttgart (DE)

(72) Inventors: Carsten Gitt, Stuttgart (DE); Tobias Haerter, Stuttgart (DE); Peter Hahn, Stuttgart (DE); Andreas Kolb, Wernau (DE); Klaus Riedl, Tübingen (DE); Tobias Schilder, Ludwigsburg (DE); Jonathan Zeibig, Aalen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/286,381

(22) PCT Filed: Mar. 31, 2022

(86) PCT No.: PCT/EP2022/058661
§ 371 (c)(1),
(2) Date: Oct. 11, 2023

(87) PCT Pub. No.: WO2022/218724
PCT Pub. Date: Oct. 20, 2022

(65) Prior Publication Data
US 2024/0181865 A1    Jun. 6, 2024

(30) Foreign Application Priority Data
Apr. 12, 2021 (DE) .................... 10 2021 001 879.6

(51) Int. Cl.
*B60K 6/365* (2007.10)
*B60K 6/48* (2007.10)
(Continued)

(52) U.S. Cl.
CPC ............... *B60K 6/365* (2013.01); *B60K 6/48* (2013.01); *B60K 6/547* (2013.01); *F16H 3/62* (2013.01);
(Continued)

(58) Field of Classification Search
CPC .......... B60K 6/365; B60K 6/48; B60K 6/547; B60K 2006/4816; F16H 3/62;
(Continued)

(56) References Cited

U.S. PATENT DOCUMENTS 7,329,201 B2 *   2/2008   Raghavan ............ B60W 20/00
                                                    475/5
7,387,585 B2 *   6/2008   Bucknor ................ B60K 6/40
                                                    475/5
(Continued)

FOREIGN PATENT DOCUMENTS

DE     112006001124 T5     5/2008
DE     102007054359 A1     6/2008
(Continued)

OTHER PUBLICATIONS

International Search Report and Written Opinion mailed Jul. 12, 2022 in related/corresponding International Application No. PCT/EP2022/058661.
(Continued)

*Primary Examiner* — Sherry L Estremsky
(74) *Attorney, Agent, or Firm* — PATENT PORTFOLIO BUILDERS PLLC

(57) ABSTRACT

A hybrid drive system includes an internal combustion engine having a first output shaft, an electric machine having a rotor with a rotor shaft as second output shaft, and a transmission having a four-shaft, first planetary set, a second planetary set, a first shifting element, a second shifting element, a third shifting element, and a third output shaft.

(Continued)

The four-shaft, first planetary set has a first shaft, a second shaft, a third shaft, and a fourth shaft, the second planetary set has a first element, a second element, and a third element. The first shaft, the second shaft, the third shaft, and the fourth shaft are rotatable relative to one another and connectable to one another in a rotationally fixed manner by a blocking shifting element. The first output shaft is coupled or is couplable to the first shaft in a rotationally fixed manner.

17 Claims, 4 Drawing Sheets

(51) Int. Cl.
    *B60K 6/547*     (2007.10)
    *F16H 3/62*     (2006.01)
(52) U.S. Cl.
    CPC ... *B60K 2006/4816* (2013.01); *B60Y 2200/92* (2013.01); *F16H 2200/2007* (2013.01)
(58) Field of Classification Search
    CPC ..... F16H 2200/2007; F16H 2200/2038; F16H 2200/201; F16H 2200/2023; B60Y 2200/92
    See application file for complete search history.

(56) References Cited

U.S. PATENT DOCUMENTS

| | | | | |
|---|---|---|---|---|
| 7,452,296 | B2* | 11/2008 | Bucknor | B60K 6/547 475/5 |
| 7,481,731 | B2 | 1/2009 | Usoro | |
| 7,609,011 | B2* | 10/2009 | Yatabe | B60K 6/365 318/140 |
| 2006/0276288 | A1 | 12/2006 | Iwanaka et al. | |
| 2007/0275815 | A1 | 11/2007 | Raghavan | |
| 2009/0275437 | A1 | 11/2009 | Kersting | |
| 2011/0111908 | A1 | 5/2011 | Kim et al. | |

FOREIGN PATENT DOCUMENTS

| | | |
|---|---|---|
| DE | 102010042005 A1 | 5/2011 |
| DE | 102014225168 A1 * | 6/2016 |
| DE | 102019208556 A1 | 12/2020 |
| EP | 0787926 A2 | 8/1997 |
| KR | 20200022238 A * | 3/2020 |
| WO | 2015137124 A1 | 9/2015 |

OTHER PUBLICATIONS

Office Action dated Nov. 18, 2021 in related/corresponding DE Application No. 10 2021 001 879.6.

* cited by examiner

HYBRID DRIVE SYSTEM FOR A MOTOR VEHICLE, AND MOTOR VEHICLE

BACKGROUND AND SUMMARY OF THE INVENTION

Exemplary embodiments of the invention relate to a hybrid drive system for a motor vehicle, as well as to a motor vehicle having such a hybrid drive system.

DE 10 2019 208 556 A1, DE 10 2007 054 359 A1, EP 0 787 926 A2 all disclose transmissions for a hybrid drive arrangement.

US 2009/0275437 A1 and DE 11 2006 001 124 T5 also present hybrid drive systems, each with a transmission that has a four-shaft, first planetary set and a second planetary set separate from the four-shaft planetary set.

Exemplary embodiments of the present invention provide a hybrid drive system for a motor vehicle, in particular for a motor car, and a motor vehicle, so that a particularly space-saving and cost-effective design of the hybrid drive system can be realized.

A first aspect of the invention relates to a hybrid drive system for a motor vehicle, in particular for a motor car, preferably in the form of a passenger car. This means that the motor vehicle in its fully manufactured state comprises the hybrid drive system, also referred to as hybrid drive device or designed as a hybrid drive device, and can be driven by means of the hybrid drive system. The hybrid drive system comprises an internal combustion engine, also known as a combustion engine, which has a first output shaft. The internal combustion engine is preferably designed as a reciprocating piston engine or machine, so that the first output shaft is preferably a crankshaft. Via the first output shaft, the internal combustion engine can provide first torques, also referred to as first drive torques or first drive moments, for driving the motor vehicle. The hybrid drive system also comprises an electric machine which has a rotor with a rotor shaft. The rotor shaft is a second output shaft, or the rotor shaft is also referred to as second output shaft. Via the rotor shaft, the electric machine can provide second torques, also referred to as second drive torques or second drive moments, for driving the motor vehicle. By way of example, the electric machine has a stator by means of which the rotor can be driven. The rotor can rotate about a machine rotation axis relative to the stator. The rotor shaft is a second output shaft, or the rotor shaft is also referred to as a second output shaft. The electric machine is preferably a high-voltage component, the electrical voltage, in particular electrical operating or nominal voltage, of which is preferably greater than 50 volts, in particular greater than 60 volts, and especially preferably several hundred volts. As a result, particularly high electrical outputs can be realized for driving the motor vehicle electrically, in particular purely electrically. In particular, the electric machine can be operated in motor mode and thus as an electric motor by means of which the motor vehicle can be driven electrically, in particularly purely electrically. Thus, in its motor mode of operation, the electric machine provides the respective, second drive torque for driving the motor vehicle.

The hybrid drive system comprises a transmission having a four-shaft, first planetary set. The feature that the first planetary set, which is also referred to as a planetary gear set, is a four-shaft planetary set is to be understood to mean in particular that the first planetary set has at least or preferably exactly four shafts, via which a respective torque can be introduced into the first planetary set and/or removed from the first planetary set. The transmission also comprises a second planetary set, which is also referred to as a second planetary gear set and is provided, in particular, in addition to the first planetary set. Furthermore, the transmission comprises a first shifting element, a second shifting element, and a third shifting element. The transmission also comprises a third output shaft, via which torques, also referred to as output torques or output moments, can be removed from the transmission. In other words, the transmission can provide output torques via its third output shaft for driving the motor vehicle. By way of example, the respective output torques results from the respective first drive torque and/or the respective second drive torque. The shafts of the four-shaft, first planetary set are also referred to as first shaft, second shaft, third shaft, and fourth shaft. In this case, the second planetary set has a first element, a second element, and a third element. The elements of the second planetary set are also referred to, for example, as transmission elements. In particular, the elements of the second planetary set can be a sun gear, a planet carrier—also referred to as a bridge—and a ring gear of the second planetary set. The first shaft, the second shaft, the third shaft, and the fourth shaft can be rotated relative to each other, in particular about a planetary set rotation axis, and for example relative to a housing of the hybrid drive system. It is conceivable in this case that the first planetary set and/or the second planetary set are each arranged at least in part in the housing. The first shaft, the second shaft, the third shaft, and the fourth shaft can be connected to one another in a rotationally fixed manner by means of a blocking shifting element of the hybrid drive system. It is conceivable in this case that the blocking shifting element is provided in addition to the aforementioned shifting elements and is thus a fourth shifting element, or the blocking shifting element is formed by one of the aforementioned shifting elements. The planetary set rotation axis is also referred to simply as rotation axis.

The first output shaft is or can be coupled to the first shaft in a rotationally fixed manner. This is to be understood as meaning, in particular, that the first output shaft is permanently connected to the first shaft in a rotationally fixed manner, or the first output shaft can be connected to the first shaft in a rotationally fixed manner.

In the context of the present disclosure, the feature that two components are connected to one other in a rotationally fixed manner is to be understood as meaning that the components are arranged coaxially to one other and are connected to one other in such a way that they rotate together at the same angular velocity about a component rotation axis common to the components.

The feature that the or two components are permanently connected to one another in a rotationally fixed manner is to be understood as meaning that for instance no switching element is provided that can be switched between a coupling state connecting the components to one other in a rotationally fixed manner and a decoupling state releasing the components for rotation relative to each other, in particular about the component rotation axis, but rather the components are always or permanently connected to each other in a rotationally fixed manner.

The feature that the or two components can be connected to one another in a rotationally fixed manner is to be understood as meaning that the components are assigned a switching element which can be switched between at least one coupling state and at least one decoupling state. In the coupling state, the components are fixedly connected to one another by means of the switching element. In the decoupling state, the components are decoupled from one another, so that in the decoupling state, the components can rotate relative to one another in particular about the component rotation axis.

It is moreover provided in the case of the hybrid drive system that the rotor shaft is or can be coupled to the second shaft, in particular in a rotationally fixed manner, in such a way that torques, such as the second drive torques, emanating from or are provided by the rotor shaft can be or are introduced via the second shaft into the transmission. It is furthermore provided that the third shaft can be connected to the third output shaft in a rotationally fixed manner by means of the first shifting element. This is to be understood, in particular, as meaning the following: the first shifting element can be switched between a first coupling state and a first decoupling state. In the first coupling state, the third shaft is connected to the third output shaft in a rotationally fixed manner by means of the first shifting element. In the first decoupling state, the first shifting element releases the third shaft and the third output shaft in such a way that in the first decoupling state, the third shaft can be rotated relative to the third output shaft or vice versa. In this case, for example, the first shifting element can be moved, in particular relative to the housing and/or translationally, between at least one first coupling position and at least one first decoupling position. The first coupling position brings about the first coupling state and the first decoupling position brings about the first decoupling state.

In order to be able to realize a particularly space-saving and cost-effective design of the hybrid drive system, it is also provided in a known manner that the fourth shaft is connected or coupled or can be connected or coupled in a rotationally fixed manner to the first element of the second planetary set. In this way, a particularly compact design can be realized, in particular in the axial direction of the transmission and thus of the hybrid drive system. In the context of the present disclosure, the term "axial" refers to the planetary set rotation axis, so that a particularly compact, i.e., short, design of the hybrid drive system can be produced, in particular when viewed along the planetary set rotation axis. In other words again, a particularly short length of the hybrid drive system can be realized along the axial direction of the transmission. In addition, components can be arranged particularly close to the internal combustion engine in the axial direction of the transmission, so that the hybrid drive system requires particularly low installation space. Furthermore, the costs of the hybrid drive system according to the invention can be kept particularly low. As a result, the transmission can be advantageously integrated into the motor vehicle, in particular as a hybrid multi-gear transmission. By using the shifting elements, the transmission can be designed as a multi-gear transmission. This means that a plurality of shiftable and thus engageable and disengageable gears of the transmission can be provided, the gears of which can differ from each other, for example, in their respective ratios. Furthermore, it is possible to design at least one of the gears, a plurality of the gears or all gears of the transmission to have powershift capability.

Particularly advantageously, the fourth shaft is or can be connected to the first element of the second planetary set in a rotationally fixed manner, bypassing the first shifting element.

In the context of the present disclosure, rotatable components arranged coaxially with respect to one another are to be understood as meaning those components or component parts which are rotatable, in particular relative to the housing, about a respective component rotation axis, with the respective component rotation axes being coaxial with respect to one another or coinciding.

According to the invention it is provided that the first shaft comprises a first sun gear of the first planetary set, wherein the third shaft comprises a second sun gear of the first planetary set. This makes it possible to realize a particularly efficient drive of the motor vehicle in a way that is particularly advantageous in terms of installation space, weight, and cost.

In order to be able to keep the installation space requirement, the weight, and the costs of the hybrid drive system particularly low, it is provided in one advantageous embodiment of the invention that the second planetary set has exactly three elements in the form of the aforementioned elements.

Another embodiment is characterized in that the four-shaft, first planetary set has exactly four shafts in the form of the aforementioned shafts. This makes it possible to construct the hybrid drive system in a way that is particularly advantageous in terms of installation space, weight, and cost. The first planetary set preferably has six transmission elements of the first planetary set, namely preferably two sun gears, two planet carriers, and two ring gears. A person skilled in the art first assigns a shaft to each of these six transmission elements of the first planetary set, i.e., a total of six shafts of the first planetary set. Two of the six elements of the first planetary set are preferably connected to one another in a rotationally fixed manner. And two more of the six elements of the first planetary set are preferably connected to one another in a rotationally fixed manner. In this way, the first planetary set preferably has the four shafts arranged so that they can rotate relative to one another.

In another, particularly advantageous embodiment of the invention, the second element of the second planetary set can be connected to the housing in a rotationally fixed manner by means of the third shifting element. Thus, for example, the third shifting element can be switched between a second coupling state and a second decoupling state. In the second coupling state, the second element is connected to the housing in a rotationally fixed manner by means of the third shifting element, so that relative rotations between the housing and the second element are prevented. In the second decoupling state, the third shifting element releases the second element for rotation about the housing, so that in the second decoupling state, the second element is rotatable relative to the housing, in particular about an element rotation axis which is a rotation axis of the second planetary set. In this case it is particularly preferred that the planetary sets are arranged coaxially to each other, so that the planetary set rotation axis, about which the shafts can rotate, in particular relative to the housing and/or relative to one another, coincides with the element rotation axis of the second planetary set. In this case, for example, the third shifting element can be moved, in particular relative to the housing and/or translationally, between at least one second coupling position that brings about the second coupling state and/or at least one second decoupling position that brings about the second decoupling state.

It is also preferably provided in this case that the first element is connected or coupled to the fourth shaft in a rotationally fixed manner, in particular permanently. It is moreover preferably provided in this embodiment that the third element is connected or coupled to the third output shaft in a rotationally fixed manner, in particular permanently. As a result, the hybrid drive system can be made particularly compact.

Alternatively, in order to be able to implement a particularly compact design of the hybrid drive system, in particular in the axial direction of the transmission, it is provided in another embodiment of the invention that the second element is connected to the housing in a rotationally fixed manner, in particular permanently. It has been shown to be particularly advantageous in this case if the first element can be connected to the fourth shaft in a rotationally fixed manner by means of the third shifting element. It is thus provided in this embodiment that, in the second coupling state, the first element is connected to the fourth shaft in a rotationally fixed manner by means of the third shifting element, wherein the third shifting element releases the first element and the fourth shaft in the second decoupling state in such a way that that the first element and the fourth shaft can be rotated relative to one another, in particular about the planetary set rotation axis and about the element rotation axis respectively. Furthermore, these embodiments are characterized in that the third element is connected to the third output shaft in a rotationally fixed manner, in particular permanently.

It is provided in another, alternative and particularly advantageous embodiment of the invention that the second element is connected to the housing in a rotationally fixed manner, in particular permanently. In this case, the first element is connected to the fourth shaft in a rotationally fixed manner, in particular permanently, and the third element can be connected to the third output shaft in a rotationally fixed manner by means of the third shifting element. It is thus preferably provided in this embodiment that in the second coupling state, the third element is connected to the third output shaft in a rotationally fixed manner by means of the third shifting element, wherein in the second decoupling state, the third shifting element releases the third element and the third output shaft in such a way that the third element and the third output shaft can be rotated relative to one another, in particular about the planetary set rotation axis and about the element rotation axis respectively. In this way, a particularly short length of the hybrid drive system can be realized, in particular when viewed in the axial direction of the transmission.

In order to keep the number of parts and thus the costs, the weight, and the installation space requirement of the hybrid drive system particularly low, it can be provided in a further embodiment of the invention that in total exactly three shifting elements are provided in the form of the first shifting element, the second shifting element designed as the blocking shifting element, and the third shifting element. In other words, the hybrid drive system comprises exactly three shifting elements in the form of the aforementioned shifting elements, wherein the first shifting element is designed as the blocking shifting element. In addition, the aforementioned gears, in particular those with powershift capability, can be realized in a particularly advantageous manner, so that the transmission can be designed as a multi-gear transmission, which is particularly advantageous in terms of installation space, weight, and costs.

A further embodiment is characterized in that the electric machine is arranged coaxially to, axially overlapping, and radially surrounding the transmission. This is to be understood as meaning in particular the following: The feature that the electric machine is arranged coaxially to the transmission is to be understood as meaning that the machine rotation axis about which the rotor can rotate relative to the stator coincides with the planetary set rotation axis of the first planetary set and thus preferably also with the element rotation axis of the second planetary set. The feature that the electric machine is arranged axially overlapping the transmission is to be understood in particular as meaning that at least a first longitudinal region of the transmission, in particular at least a first longitudinal region of the first planetary set and/or the second planetary set, is overlapped or covered outwardly in the radial direction of the transmission, i.e., in a direction running perpendicular to planetary set rotation axis, at least by a second longitudinal region of the electric machine. Furthermore, the feature that the electric machine is arranged radially surrounding the transmission is to be understood as meaning that at least the second longitudinal region of the electric machine completely surrounds at least the first longitudinal region of the transmission in the circumferential direction of the transmission extending around the planetary set rotation axis, so that the first longitudinal region is arranged in the second longitudinal region. As a result, the hybrid drive system can be made particularly compact.

It is provided in a further, particularly advantageous embodiment of the invention that the second shaft comprises or is a first ring gear of the first planetary set and a second ring gear of the first planetary set which is connected to the first ring gear in a rotationally fixed manner, in particular permanently. In this way, the number of parts and thus the costs, the installation space requirement and the weight of the hybrid drive system can be kept particularly low.

It is provided in a further particularly advantageous embodiment of the invention that the fourth shaft comprises a first planet carrier of the first planetary set, the first planet carrier of which can, for example, be connected to the second planet carrier in a rotationally fixed manner, in particular permanently. In this way, a particularly advantageous drive of the motor vehicle can be provided in a particularly space-saving manner.

Finally, it has been shown to be particularly advantageous if the internal combustion engine, an output pinion which is connected in particular permanently to the third output shaft in a rotationally fixed manner, the second planetary set and the four-shaft, first planetary set are arranged in the following order: the internal combustion engine—the output pinion—the second planetary set—the four-shaft, first planetary set. In other words, it is preferably provided that, as viewed in axial direction of the transmission and thus along the planetary set rotation axis, the output pinion follows the internal combustion engine, the second planetary set follows the output pinion and the four-shaft, first planetary set follows the second planetary set. In this way, the axial length of the hybrid drive system can be kept within a particularly small range.

A second aspect of the invention relates to a motor vehicle, preferably in the form of a motor car, in particular a passenger car, which has a hybrid drive system according to the first aspect of the invention and can be driven by means of the hybrid drive system. The motor vehicle is thus a hybrid vehicle. Advantages and advantageous embodiments of the first aspect of the invention are to be regarded as being advantages and advantageous embodiments of the second aspect of the invention, and vice versa. Since the length of the hybrid drive system in the axial direction of the transmission can be kept particularly short, the hybrid drive system can particularly advantageously be installed transversely, i.e., used as a transverse installation. This is to be understood as meaning that in the completely manufactured state of the motor vehicle, the axial direction of the transmission and thus of the hybrid drive system as a whole extends transversely or perpendicularly to the longitudinal direction of the vehicle (y direction).

Further advantages, features and details of the invention will emerge from the subsequent description of preferred exemplary embodiments and with reference to the drawing. The features and feature combinations mentioned above in the description and the features and feature combinations mentioned hereinbelow in the description of the figures and/or shown in the figures on their own can be used not only in the respectively specified combination but also in other combinations or in isolation, without departing from the scope of the invention.

BRIEF DESCRIPTION OF THE DRAWING FIGURES

In the drawing.

In the figures, identical or functionally identical elements are provided with the same reference signs.

DETAILED DESCRIPTION

Figure 1:
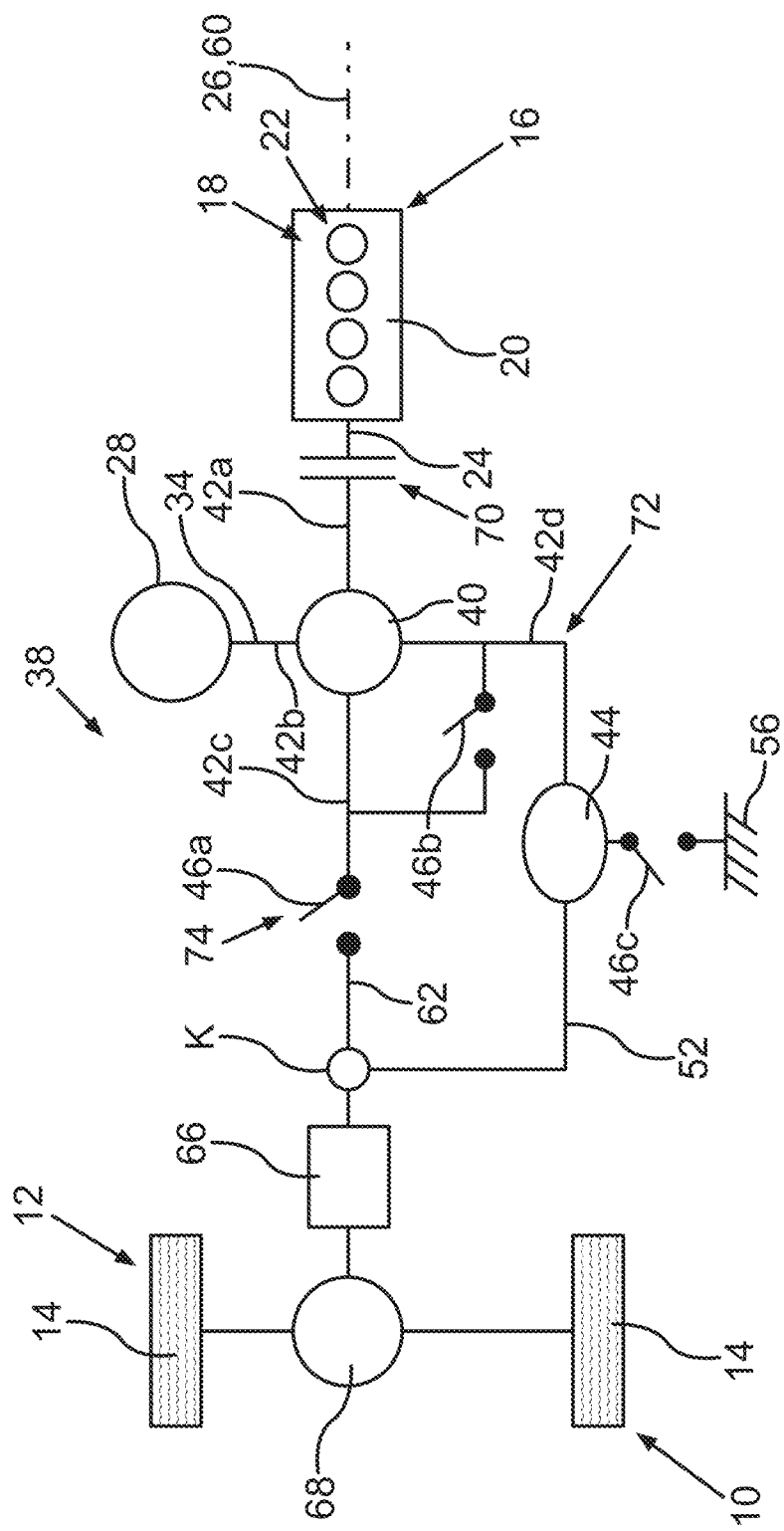
FIG. 1 shows a schematic depiction of a drivetrain for a motor vehicle, with a hybrid drive system according to the invention.

FIG. 1 shows a schematic depiction of a drivetrain 10 for a motor vehicle that is preferably in the form of a motor car, in particular a passenger car. In its fully manufactured state, the motor vehicle has at least or exactly two axles that are arranged one behind the other in the longitudinal direction of the vehicle (x direction) and are also referred to as vehicle axles, with the drivetrain 10 comprising one of the axles. The axle of the drivetrain 10 is labelled with 12 in FIG. 2. The axle 12 has at least or exactly two wheels 14, also referred to as vehicle wheels, which are opposite one another in the transverse direction of the vehicle (y direction) and are drivable or driven wheels. By driving the wheels 14, the motor vehicle is driven as a whole. The drivetrain 10 comprises a hybrid drive system 16, by means of which the wheels 14 and thus the motor vehicle can be driven. The hybrid drive system 16 has an internal combustion engine 18, also referred to as combustion engine or fuel-burning engine. It can be seen from FIG. 1 that the internal combustion engine 18 has an engine block 20 forming or, in particular directly, delimiting a plurality of cylinders 22. The respective cylinder 22 partially delimits a respective combustion chamber in which combustion processes take place during a fired operation of the internal combustion engine 18. The internal combustion engine 18 has a first output shaft 24, which in the present case is designed as a crankshaft. In this case, the internal combustion engine 18 is designed as a reciprocating piston engine. The crankshaft (first output shaft 24) is rotatable relative to the engine block 20 about a crankshaft rotation axis 26. Via the crankshaft, the internal combustion engine 18 can provide first drive torques to drive the motor vehicle.

The hybrid drive system 16 also comprises an electric machine 28 that is depicted particularly schematically in FIG. 1. As can be seen from FIG. 2, which shows a first embodiment of the hybrid drive system 16, the electric machine 28 has a stator 30 and a rotor 32 comprising a rotor shaft 34. The rotor 32 and thus the rotor shaft 34 are rotatable about a machine rotation axis 36 relative to the stator 30 and also relative to the engine block 20. It can be seen from FIG. 2 that the electric machine 28 is arranged coaxially to the internal combustion engine 18, so that the machine rotation axis 36 coincides with the crankshaft rotation axis 26. The rotor 32 or the rotor shaft 34 is a second output shaft, via which the electric machine 28, in its motor mode of operation, can provide second drive torques to drive the motor vehicle or the wheels 14.

The hybrid drive system 16 also comprises a transmission 38. The transmission 38 has a four-shaft, first planetary set 40 having at least or in the present case exactly four shafts 42a-d. The transmission 38 also comprises a second planetary set 44 and, in particular exactly, three shifting elements 46a-c; namely a first shifting element 46a, a second shifting element 46b, and a third shifting element 46c. The first shifting element 46a is also labelled with SB, the second shifting element 46b is also labelled with SK, and the third shifting element 46c is also labelled with SA. The shaft 42a is also referred to as first shaft 42a, the shaft 42b is also referred to as second shaft 42b, the shaft 42c is also referred to as third shaft 42c, and the shaft 42d is also referred to as fourth shaft 42d. The second planetary set 44 has, in particular exactly, three elements. In the first embodiment shown in FIG. 2, a first of the elements of the second planetary set 44 is a third sun gear 48 of the second planetary set 44, a second of the elements of the planetary set 44 is a third ring gear 50 of the second planetary set 44, and the third element of the second planetary set 44 is a second planet carrier 52 of the second planetary set 44. The second planet carrier 52 is also referred to as second bridge. In this case, the second planetary set 44 comprises second planetary gears 54 of the second planetary set 44 that are rotatably mounted on the second planet carrier 52. The respective second planetary gear 54 meshes directly with the sun gear 48 on the one hand and directly with the ring gear 50 of the second planetary set 44 on the other hand. The shafts 42a-d are rotatable relative to one another about housing 56, which is shown particularly schematically relative to one another in FIG. 2, of the transmission 38 and thus of the hybrid drive system 16, namely about a planetary set rotation axis 58, which is also referred to simply as rotation axis. It can be seen from FIG. 2 that the planetary set 40 is arranged coaxially to the electric machine 28 and coaxially to the internal combustion engine 18, so that the planetary set rotation axis 58 (rotation axis) coincides with the machine rotation axis 36 and with the crankshaft rotation axis 26. In addition, at least one of the elements of the planetary set 44 is rotatable about an element rotation axis 60 relative to the housing 56 and/or relative to at least a further one of the elements of the planetary set 44. It can be seen from FIG. 2 that the planetary sets 40 and 44 are arranged coaxially to one another, so that the planetary set rotation axis 58 coincides with the element rotation axis 60. In addition, the element rotation axis 60 coincides with the machine rotation axis 36 and with the crankshaft rotation axis 26. Furthermore, the shafts 42a-d can be connected to one another in a rotationally fixed manner by means of a blocking element. In the first embodiment shown in FIG. 2, the blocking shifting element is formed by the second shifting element 46b, so that the shafts 42a-d can be connected to one another in a rotationally fixed manner by means of the second shifting element 46b.

The transmission 38 comprises a third output shaft 62, via which output torques can be removed from the transmission 38. The respective output torque results, for example, from the respective first drive torque and/or from the respective second drive torque. In this case, the third shaft 42c can be connected to the third output shaft 62 in a rotationally fixed manner by means of the first shifting element 46a. It can be seen from FIG. 2 that the transmission 38 has a spur gear in the form of an output pinion 64, which is connected to the output shaft 62 in a rotationally fixed manner, in particular permanently. It can be seen from FIG. 1 that the hybrid drive system 16 can have a final ratio 66, also referred to as final drive or final drive ratio, which can be single-stage or multi-stage. The final drive ratio 66 comprises the output pinion 64. In this case, the axle 12 comprises a differential gear 68, also referred to simply as a differential, the function of which includes, in particular, allowing different rotational speeds of the wheels 14 when the motor vehicle is cornering, in particular in such a way that the wheel on the outside of the bend rotates or can rotate at a higher speed than the wheel on the inside of the bend, in particular while the wheels 14 are being driven by the internal combustion engine 18 and/or the electric machine 28 via the differential gear 68. The final drive ratio 66 is arranged in this case in relation to a torque flow, via which the respective output torque provided by the transmission 38 via the third output shaft 62 can be or is transmitted from the output shaft 62 to the differential gear 68, in the torque flow and between the output shaft 62 and the differential gear 68, i.e., downstream of the output shaft 62 and upstream of the differential gear 68, whereby the final drive ratio 66 is the last gear ratio before the differential gear 68 along the flow of torque flowing from the output shaft 62 to the differential gear 68.

The hybrid drive system 16 also comprises a disconnect clutch 70, which is also labelled with K0. The disconnect clutch 70 is preferably a friction clutch. The disconnect clutch 70 can be in particular a multi-plate clutch. By means of the disconnect clutch 70, the crankshaft (output shaft 24) can be connected to the first shaft 42a in a rotationally fixed manner.

In order to be able to construct the hybrid drive systems 16 in a particularly space-saving and cost-effective manner, the fourth shaft 42d is or can be connected to the first element of the second planetary set 44 in a rotationally fixed manner. It is thus provided in the first embodiment shown in in FIG. 2 that the fourth shaft 42d is connected to the sun gear 48 of the planetary set 44 in a rotationally fixed manner, in particular permanently.

Figure 2:
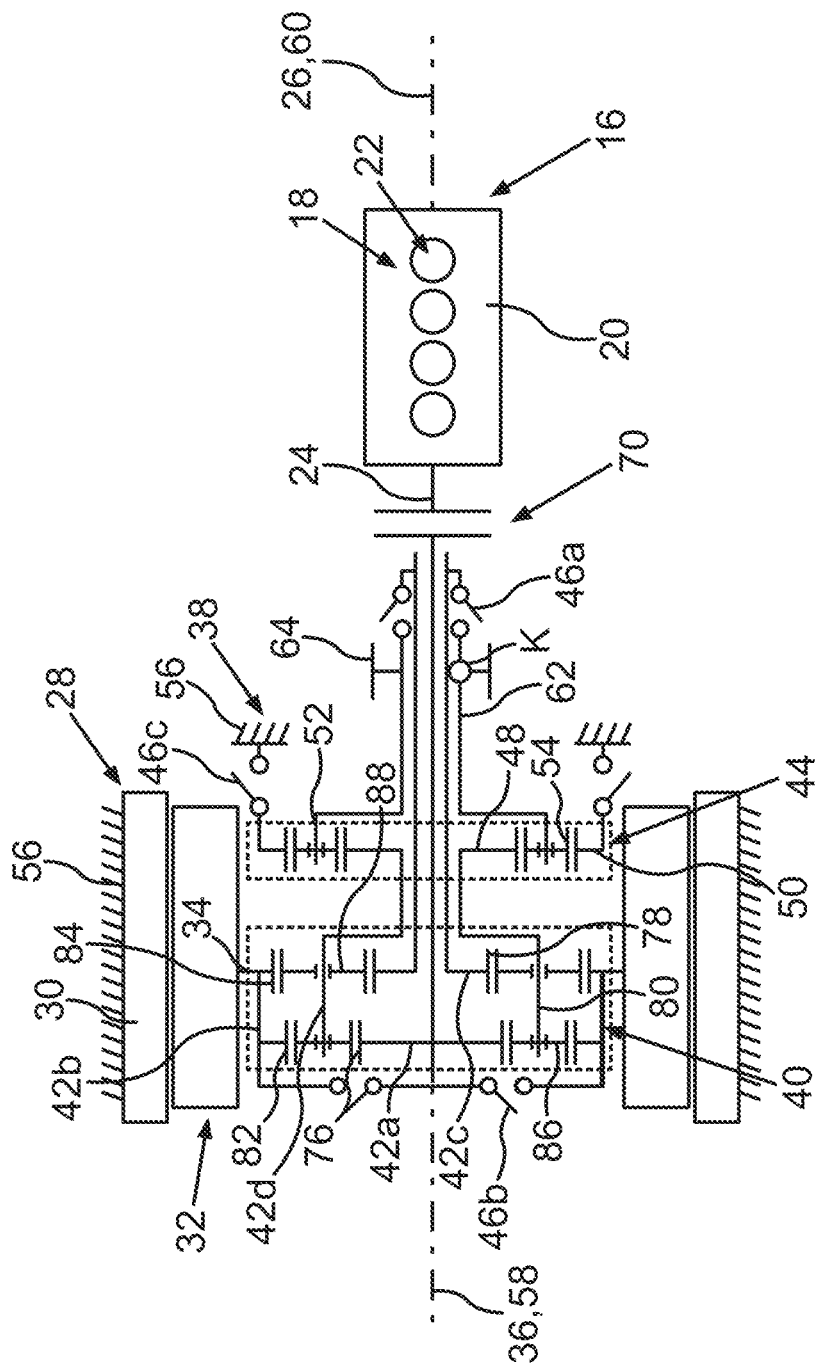
FIG. 2 shows a schematic depiction of the hybrid drive system according to a first embodiment.

It can be seen from FIGS. 1 and 2 that the hybrid drive system 16 is a vehicle drive having at least the internal combustion engine 18, the electric machine 28, and the at least or exactly four-shaft planetary set 40. The hybrid drive system 16 also has a mechanical, first path 72 and a mechanical, second path 74. Furthermore, the hybrid drive system 16 comprises a node K, at or in which the sections 72 and 74 are or can be connected, in particular in a rotationally fixed manner. This node K is or can be connected to the drivable or driven axle 12 and thus to the wheels 14. In the case of the first embodiment, the shaft 42a is or can be coupled to the crankshaft in a rotationally fixed manner, in particular by means of the disconnect clutch 70. By way of example, the shaft 42d is part of the mechanical path 72 that thus comprises the shaft 42d and in particular, as a further shaft, second planet carrier 52. The mechanical path 72 also comprises a sub-transmission, which in the present case is designed as the second planetary set 44. This sub-transmission is connected directly or indirectly to the shaft 42d and the other shaft (planet carrier 52). By way of example, the shaft 42c is a part of the mechanical path 74 that thus comprises the shaft 42c and the shifting element 46a as well as the output shaft 62 as the other shaft. In the present case, the node K comprises, for example, the output pinion 64 so that in the present case the shaft 42c can be connected to the output shaft 62 and thus to the node K (output pinion 64) in a rotationally fixed manner by means of the shifting element 46a. The rotor shaft 34 does not have to be a separate shaft, so that it is conceivable that the rotor 32 can be or is directly connected or connectable to the shaft 42b or, in other words, the rotor shaft 34 can be the shaft 42b, or vice versa. In other words again, the rotor shaft 34 can be integral with the shaft 42b, or vice versa.

The sub-transmission, i.e., the planetary set 44, preferably has a gear ratio of not equal 1:1 or a gear stage with a ratio that is not equal to 1:1. The mechanical path 72 also comprises the third shifting element 46c, also labelled with SA, by means of which, for example, in the second embodiment, the ring gear 50 of the planetary set 44 can be connected to the housing 56 in a rotationally fixed manner. If the shifting element SA (third shifting element 46c) is thus closed, there is a mechanical connection between one of the shafts 42a-d of the four-shaft, first planetary set 40 and the node K, in particular via the mechanical path 72. In this case, the shifting element SA can be arranged inside or outside the sub-transmission.

It can be seen that in the first embodiment, the second planetary set 44 has exactly three elements in the form of the sun gear 48, the ring gear 50, and the planet carrier 52. It is further provided that the four-shaft, first planetary set 40 has exactly four shafts 42a-d. In the first embodiment shown in FIG. 2, the ring gear 50, which is a or the second element of the planetary set 44, can be connected to the housing 56 in a rotationally fixed manner by means of the third shifting element 46c, and the sun gear 48, which is the or a first element of the planetary set 44, is connected to the fourth shaft 42d in a rotationally fixed manner, in particular permanently, and the planet carrier 52, which is a or the third element of the planetary set 44, is connected to the output shaft 62 (third output shaft) in a rotationally fixed manner, in particular permanently.

Figure 3:
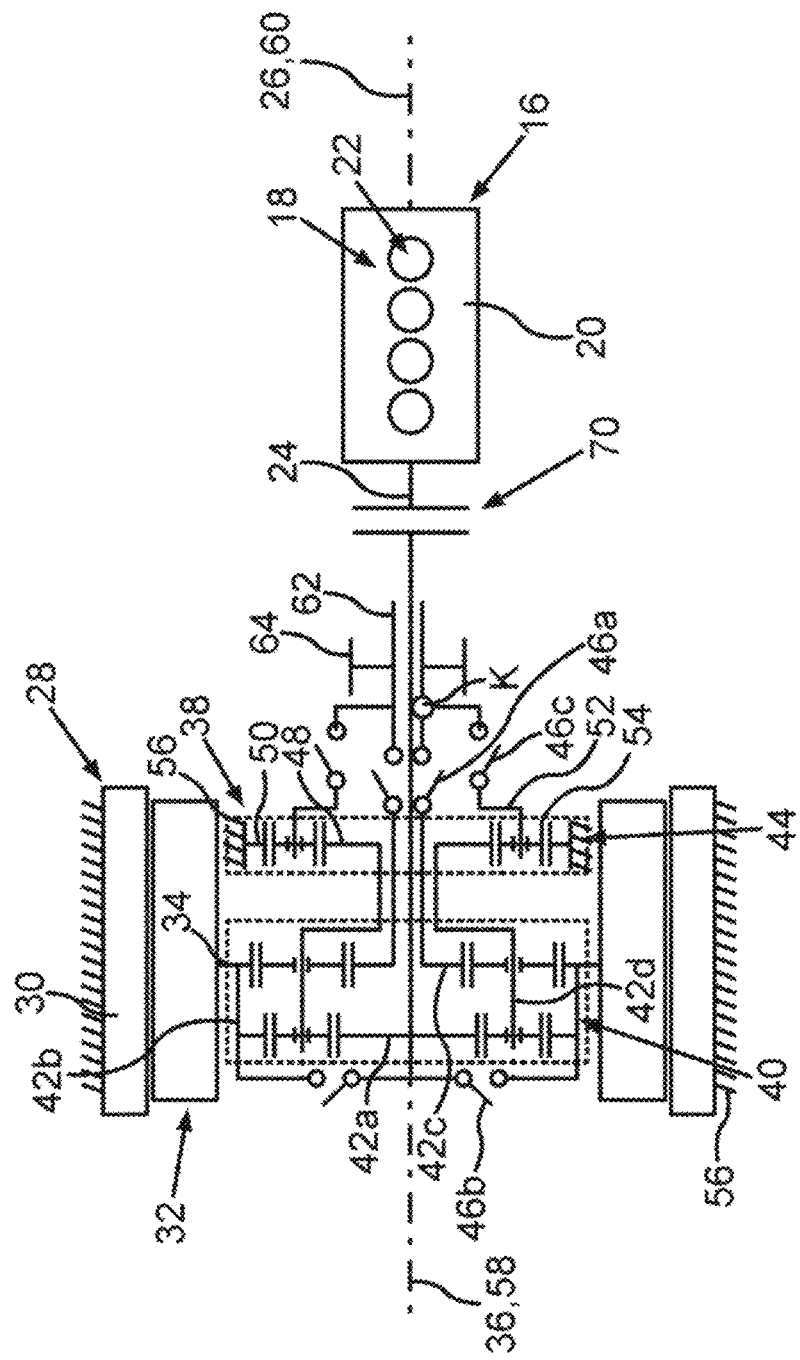
FIG. 3 shows a schematic depiction of the hybrid drive system according to a second embodiment.

FIG. 3 shows a second embodiment of the hybrid drive system 16. In the second embodiment, the ring gear 50 (second element) is connected to the housing 56 in a rotationally fixed manner, in particular permanently, and the sun gear 48 (first element) is connected to the fourth shaft 42d in a rotationally fixed manner, in particular permanently, and the planet carrier 52 (third element) can be connected to the third output shaft 62 and thus to the output pinion 64 and the node K in a rotationally fixed manner by means of the third shifting element 46c.

In a third embodiment (not shown in the figures), the second element (ring gear 50) is connected to the housing 56 in a rotationally fixed manner, in particular permanently, and the first element (sun gear 48) is connected to the fourth shaft 42d in a rotationally fixed manner by means of the third shifting element 46c, and the third element (planet carrier 52) is connected to the third output shaft 62 in a rotationally fixed manner, in particular permanently.

It is conceivable in a further embodiment that the second element (ring gear 50) can be connected to the housing 56 in a rotationally fixed manner by means of the shifting element 46c, and the first element (sun gear 48) is connected to the fourth shaft 42d in a rotationally fixed manner, in particular permanently, and the third element (planet carrier 52) can be connected to the third shaft 42c in a rotationally fixed manner by means of the second shifting element 46b.

It is conceivable in principle that the output pinion 64 meshes directly with the differential gear 68, i.e., with an input gear of the differential gear 66 designed, for example, as crown gear, or an idler gear can be provided in such a way that the output pinion 64 meshes directly with the idler gear without meshing directly with the input gear, which meshes directly with the idler gear.

The four-shaft, first planetary set 40 is preferably designed such that the first shaft 42a is a or the sum shaft with respect to the fourth shaft 42d and the third output shaft 62, in particular as soon as a gear stage in the sub-transmission is actively engaged and the shifting element SB (first shifting element 46a) is closed and the electric machine 28 does not produce any significant torque, and such that the fourth shaft 42d is the or a sum shaft with respect to the rotor shaft 34 and the first shaft 42a as soon as a gear stage in the sub-transmission is actively engaged and the shifting element SB is open, and the electric machine 28 provides a significant torque. In the exemplary embodiment shown in the figures, the sub-transmission has a planetary construction and is thus designed as the second planetary set 44. In this case, the planetary set 44 is preferably implemented as an, in particular exactly, three-shaft planetary set. In at least one shift state of the shifting element SA (third shifting element 46c), there is a mechanical connection, in particular via the sub-transmission, between the four-shaft, first planetary set 40 and the node K, preferably with a gear ratio which is not equal to 1, i.e., which is not equal to 1:1. Alternatively or additionally, it can preferably be provided that the mechanical path 74 between the planetary set 40 and the node K does not contain a separate gear stage such as a pair of spur gears, a planetary set or the like, so that preferably the mechanical path 74 between the four-shaft, first planetary set 40 and the node K is geared directly or with a gear ratio of 1 (1:1).

The four-shaft, first planetary set 40 can preferably be blocked via a blocking shifting element, which is also labelled with SK. In the exemplary embodiments shown in the figures, the second shifting element 46b is used as the blocking shifting element SK. By blocking the four-shaft, first planetary set 40, its four shafts 42a-d rotate as a block and thus with an identical speed, in particular about the planetary set rotation axis 58 and relative to the housing 56. It is preferably provided that the shifting element SK (blocking shifting element or second shifting element 46b) in its closed or engaged state couples or connects at least any two of the shafts 42a-d of the four-shaft, first planetary set 40 to one another in a rotationally fixed manner.

The shifting element SK (second shifting element 46b) can be designed to be frictionally engaged. The shifting element SK can be designed to be positive-locking. The shifting element SK can be designed to be positive-locking and not synchronized.

The shifting element SB (first shifting element 46a) can be designed to be positive-locking, in particular within the mechanical path 74. The shifting element SB can be designed to be positive-locking and not synchronized, in particular within the mechanical path 74. The shifting element SB can be designed to be frictionally engaged, in particular within the mechanical path 74.

The combustion engine (internal combustion engine 18) or its crankshaft can be decoupled from the rest of the drivetrain 10, also referred to as powertrain, by means of the disconnect clutch 70. The disconnect clutch also labelled with K0 can be frictionally engaged. The disconnect clutch K0 can be positive-locking. The disconnect clutch K0 can be positive-locking and not synchronized.

The sub-transmission and the four-shaft, first planetary set 40 can be connected to one another via a shaft, in the present case for example the fourth shaft 42d, in particular in a rotationally fixed manner. Alternatively, or additionally, the sub-transmission can be shifted.

The shifting element SA (third shifting element 46c) can be positive-locking, in particular within the mechanical path 72. The shifting element SA can be positive-locking and not synchronized, in particular within the mechanical path 72. The shifting element SA can be frictionally engaged, in particular within the mechanical path 72. In its engaged or closed state, the shifting element SA connects one of the shafts 42a-d of planetary set 44 to the housing 56 in a rotationally fixed manner.

The electric machine 28 and the four-shaft, first planetary set 40 are preferably arranged coaxially to one another. Moreover, it is provided in the exemplary embodiments shown in the figures that the electric machine 28 is arranged coaxially to, axially overlapping, and radially surrounding the transmission 38, in particular in such a way that the electric machine 28 is arranged coaxially to, axially overlapping, and radially surrounding the four-shaft, first planetary set 40 and/or the second planetary set 44. It is alternatively or additionally provided that the electric machine 28 and the second planetary set 40 are arranged coaxially to one another. Therefore, it is preferably provided that the sub-transmission, i.e., the second planetary set 44, is arranged between the four-shaft, first planetary set 40 and the internal combustion engine 18 as viewed in the axial direction of transmission 38 and thus along the planetary set rotation axis 58. Alternatively, or additionally, it can be provided that the sub-transmission, i.e., the second planetary set 44, is arranged between the four-shaft, first planetary set 40 and the internal combustion engine 18 in the axial direction of the transmission 38. Alternatively, or additionally, it is preferably provided that the output pinion 64, also referred to as final ratio pinion or final drive pinion, is arranged between the sub-transmission or the second planetary set 44 and the internal combustion engine 18 in the axial direction of the transmission 38.

The shifting element SB can be arranged at least substantially between the four-shaft, first planetary set 40 and the sub-transmission or the second planetary set 44 in the axial direction of the transmission 38. It is furthermore conceivable that the shifting element SB is arranged between the output pinion 64 and the internal combustion engine 18 in the axial direction of the transmission 38. It is furthermore conceivable that the shifting element SB is enclosed by a hollow shaft. This is provided in the second embodiment shown in FIG. 3. The hollow shaft is, in particular, the planet carrier 52, so that preferably the shifting element SB (first shifting element 46a) is arranged in the hollow shaft.

Figure 4:
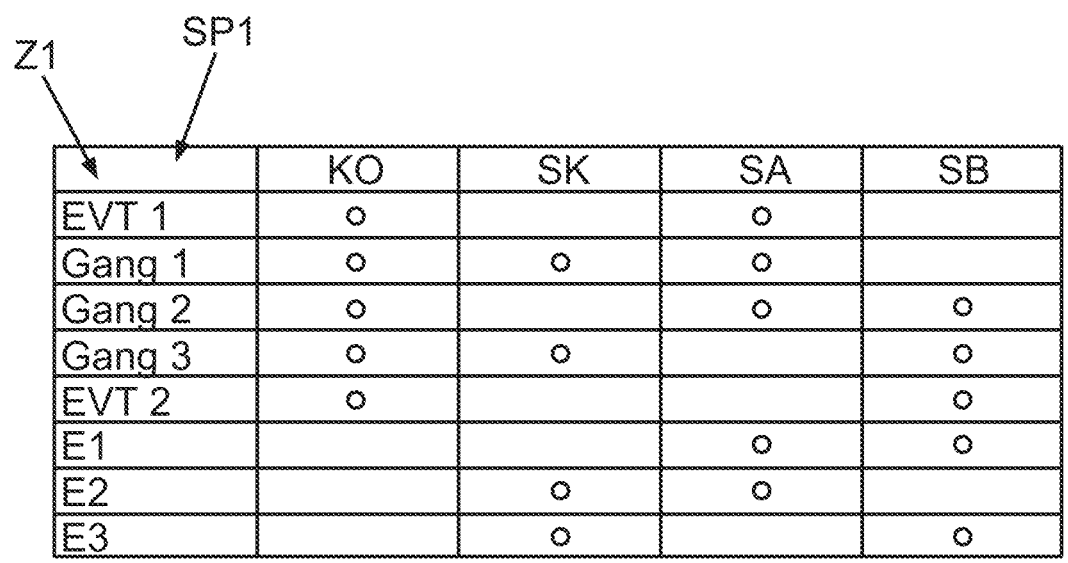
FIG. 4 shows a gear shift table explaining different operating states of the hybrid drive system.

Finally, FIG. 4 shows a gear shift table with different states EVT 1, gear 1, gear 2, gear 3, EVT 2, E1, E2, and E3 of the hybrid drive system 16. The states are entered in a column SP1 in the shift table. The disconnect clutch K0 and the shifting elements SK, SA and SB are entered in a row Z1 in the shift table. In the shift table shown in FIG. 4, a circular dot means that the disconnect clutch K0 or the respective shifting element SK, SA, and SB, under which the dot is entered, is closed or engaged. If no circular dot is entered under the disconnect clutch K0 or under the shifting element SK, SB, or SA, then the disconnect clutch K0 or the respective shifting element SK, SB or SA is open. The EVT 1 state is thus activated when the disconnect clutch K0 and the shifting element SA are simultaneously closed, while the shifting elements SK and SB are open. The gear 1 state is activated when the disconnect clutch K0 and the shifting elements SK and SA are simultaneously closed, while the shifting element SB is open. Accordingly, the gear 2 state is activated when the disconnect clutch K0 and the shifting elements SA and SB are simultaneously closed, while the shifting element SK is open. The gear 3 state is activated when the disconnect clutch K0 and the shifting elements SK and SB are simultaneously closed, while the shifting element SA is open. The EVT 2 state is activated when the disconnect clutch K0 and the shifting element SB are simultaneously closed, while the shifting elements SK and SA are open. The E1 state is activated when the shifting elements SA and SB are simultaneously closed, while the disconnect clutch K0 and the shifting element SK are open. The E2 state is activated when the shifting elements SK and SA are simultaneously closed, while the disconnect clutch K0 and the shifting element SB are open. The E3 state is activated when the shifting elements SK and SB are simultaneously closed, while the disconnect clutch K0 and the shifting element SA are open.

In other words, the hybrid drive system 16, also referred to as drive unit, can be operated in the EVT 1 state as the first EVT mode. Here, the speeds and torques of the internal combustion engine 18 and the electric machine 28 are superimposed on the four-shaft, first planetary set 40. The first EVT mode is used, inter alia, to start the motor vehicle in a hybrid mode in which both the internal combustion engine 18 and also the electric machine 28 are involved. The first EVT mode can be used, inter alia, for active gear ratio adjustment and speed synchronization, in particular within shifting element SB, when changing from gear 1 to gear 2. The electric machine 28 can be operated as a generator in the first EVT mode. The electric machine 28 can be operated as a motor in the first EVT mode. The electric machine 28 can be operated as a generator and a motor in the first EVT mode.

The drive unit can be operated in a second EVT mode, which is the state EVT 2. Here, the speeds and torques of the internal combustion engine 18 and the electric machine 28 are superimposed on the planetary set 40. The second EVT mode is used, inter alia, as an overdrive mode with a long transmission ratio. The second EVT mode can be used, inter alia, for an active gear ratio adjustment and a speed synchronization, in particular within the shifting element SK, in particular when changing from gear 2 to gear 3. The second EVT mode can be used, inter alia, for an active gear ratio adjustment and a speed synchronization, in particular within the shifting element SA, in particular when changing from gear 3 to gear 2. The electric machine 28 can be operated as a generator in the second EVT mode. The electric machine 28 can be operated as a motor in the second EVT mode. The electric machine 28 can be operated as a generator and a motor in the second EVT mode.

It can be seen from FIGS. 2 and 3 that the first shaft 42a comprises a first sun gear 76 of the planetary set 40. The third shaft 42c comprises a second sun gear 78 of the planetary set 40. The fourth shaft 42d comprises a first planet carrier 80 of the planetary set 40, the first planet carrier 80 of which can be connected to the sun gear 48 in a rotationally fixed manner, in particular permanently. The second shaft 42b comprises a first ring gear 82 and a second ring gear 84 of the planetary set 40, wherein the ring gears 82 and 84 are connected to one another in a rotationally fixed manner, in particular permanently. The ring gears 82 and 84 differ in their number of teeth. In other words, the ring gear 82 has a first number of teeth and the ring gear 84 has a second number of teeth different from the first number of teeth. In this case, first planetary gears 86 of the planetary set 40 are assigned to the ring gear 82, and second planetary gears 88 of the planetary set 44 are assigned to the ring gear 84. The respective planetary gear 86 meshes directly with the ring gear 82 on the one hand and directly with the sun gear 76 on the other hand, and the respective planetary gear 88 meshes directly with the sun gear 78 on the one hand and directly with the ring gear 84 on the other hand. In this case, both the planetary gears 86 and the planetary gears 88 are rotatably mounted on the planet carrier 80 (shaft 42d) of the planetary set 40, which planet carrier is common to the planetary gears 86 and 88. The planet carrier 80 is also as referred to as the first bridge.

LIST OF REFERENCES 10 drivetrain
12 axle
14 wheel
16 hybrid drive system
18 internal combustion engine
20 engine block
22 cylinder
24 first output shaft
26 crankshaft rotation axis
28 electric machine
30 stator
32 rotor
34 rotor shaft
36 machine rotation axis
38 transmission
40 four-shaft first planetary set
42a-d shaft
44 second planetary set
46a-c shifting element
48 sun gear
50 ring gear
52 planet carrier
54 planetary gear
56 housing
58 planetary set rotation axis
60 element rotation axis
62 third output shaft
64 output pinion
66 final drive ratio
68 differential gear
70 disconnect clutch
72 mechanical path
74 mechanical path
76 sun gear
78 sun gear
80 planet carrier
82 ring gear
84 ring gear
86 planetary gear
88 planetary gear
K node

The invention claimed is:
1. A hybrid drive system for a motor vehicle, the hybrid drive system comprising:
an internal combustion engine having a first output shaft;
an electric machine having a rotor with a rotor shaft as second output shaft; and
a transmission having a four-shaft, first planetary set, a second planetary set, a first shifting element, a second shifting element, a third shifting element and a third output shaft, wherein
the four-shaft, first planetary set has a first shaft, a second shaft, a third shaft and a fourth shaft, the second planetary set has a first element, a second element, and a third element, the first shaft, the second shaft, the third shaft, and the fourth shaft are rotatable relative to one another and connectable to one another in a rotationally fixed manner by the second shifting element, the first output shaft is coupled or is couplable to the first shaft in a rotationally fixed manner, the rotor shaft is coupled or is couplable to the second shaft in such a way that torques emanating from the rotor shaft are introducible into the transmission via the second shaft, the third shaft is couplable to the third output shaft in a rotationally fixed manner by the first shifting element, the fourth shaft is coupled or is couplable to the first element of the second planetary set in a rotationally fixed manner, the first shaft comprises a first sun gear of the first planetary set and the third shaft comprises a second sun gear of the first planetary set, and the four-shaft, first planetary set has exactly four shafts.

2. The hybrid drive system of claim 1, wherein the second planetary set has exactly three elements consisting of the first element, the second element, and the third element.

3. The hybrid drive system of claim 1, wherein the second element is coupled to a housing of the hybrid drive system in a rotationally fixed manner, the first element is couplable to the fourth shaft in a rotationally fixed manner by the third shifting element, and the third element is coupled to the third output shaft in a rotationally fixed manner.

4. The hybrid drive system of claim 3, wherein the hybrid drive system includes exactly three shifting elements, which are the first shifting element, the second shifting element configured as a blocking shifting element, and the third shifting element.

5. The hybrid drive system of claim 1, wherein the second element is coupled to a housing of the hybrid drive system in a rotationally fixed manner, the first element is coupled to the fourth shaft in a rotationally fixed manner, and the third element is couplable to the third output shaft in a rotationally fixed manner by the third shifting element.

6. The hybrid drive system of claim 5, wherein the hybrid drive system includes exactly three shifting elements, which are the first shifting element, the second shifting element configured as a blocking shifting element, and the third shifting element.

7. The hybrid drive system of claim 1, wherein the electric machine is arranged coaxially to, axially overlapping, and radially surrounding the transmission.

8. The hybrid drive system of claim 1, wherein the second shaft comprises a first ring gear of the first planetary set and a second ring gear of the first planetary set connected to the first ring gear in a rotationally fixed manner.

9. The hybrid drive system of claim 1, wherein the fourth shaft comprises a first planet carrier of the first planetary set.

10. The hybrid drive system of claim 1, wherein the internal combustion engine, an output pinion which is connected to the third output shaft in a rotationally fixed manner, the second planetary set, and the four-shaft, first planetary set are arranged in an axial direction of the transmission in the following order: the internal combustion engine, the output pinion, the second planetary set, and the four-shaft, first planetary set.

11. A hybrid drive system for a motor vehicle, the hybrid drive system comprising:

an internal combustion engine having a first output shaft;

an electric machine having a rotor with a rotor shaft as second output shaft; and a transmission having a four-shaft, first planetary set, a second planetary set, a first shifting element, a second shifting element, a third shifting element and a third output shaft, wherein the four-shaft, first planetary set has a first shaft, a second shaft, a third shaft and a fourth shaft, the second planetary set has a first element, a second element, and a third element, the first shaft, the second shaft, the third shaft, and the fourth shaft are rotatable relative to one another and connectable to one another in a rotationally fixed manner by the second shifting element, the first output shaft is coupled or is couplable to the first shaft in a rotationally fixed manner, the rotor shaft is coupled or is couplable to the second shaft in such a way that torques emanating from the rotor shaft are introducible into the transmission via the second shaft, the third shaft is couplable to the third output shaft in a rotationally fixed manner by the first shifting element, the fourth shaft is coupled or is couplable to the first element of the second planetary set in a rotationally fixed manner, the first shaft comprises a first sun gear of the first planetary set and the third shaft comprises a second sun gear of the first planetary set, the second element is couplable to a housing of the hybrid drive system in a rotationally fixed manner by the third shifting element, the first element is connected to the fourth shaft in a rotationally fixed manner, and the third element is connected to the third output shaft in a rotationally fixed manner.

12. The hybrid drive system of claim 11, wherein the hybrid drive system includes exactly three shifting elements, which are the first shifting element, the second shifting element configured as a blocking shifting element, and the third shifting element.

13. A motor vehicle, comprising:

an axle; and a hybrid drive system coupled to the axle, wherein the hybrid drive system comprises an internal combustion engine having a first output shaft;

an electric machine having a rotor with a rotor shaft as second output shaft; and a transmission having a four-shaft, first planetary set, a second planetary set, a first shifting element, a second shifting element, a third shifting element and a third output shaft, wherein the four-shaft, first planetary set has a first shaft, a second shaft, a third shaft and a fourth shaft, the second planetary set has a first element, a second element, and a third element, the first shaft, the second shaft, the third shaft, and the fourth shaft are rotatable relative to one another and connectable to one another in a rotationally fixed manner by the second shifting element, the first output shaft is coupled or is couplable to the first shaft in a rotationally fixed manner, the rotor shaft is coupled or is couplable to the second shaft in such a way that torques emanating from the rotor shaft are introducible into the transmission via the second shaft, the third shaft is couplable to the third output shaft in a rotationally fixed manner by the first shifting element, the fourth shaft is coupled or is couplable to the first element of the second planetary set in a rotationally fixed manner, the first shaft comprises a first sun gear of the first planetary set and the third shaft comprises a second sun gear of the first planetary set, and the four-shaft, first planetary set has exactly four shafts.

14. The motor vehicle of claim 13, wherein the second planetary set has exactly three elements consisting of the first element, the second element, and the third element.

15. The motor vehicle of claim 13, wherein the second element is couplable to a housing of the hybrid drive system in a rotationally fixed manner by the third shifting element, the first element is connected to the fourth shaft in a rotationally fixed manner, the third element is connected to the third output shaft in a rotationally fixed manner, and the hybrid drive system includes exactly three shifting elements, which are the first shifting element, the second shifting element configured as a blocking shifting element, and the third shifting element.

16. The motor vehicle of claim 13, wherein the second element is coupled to a housing of the hybrid drive system in a rotationally fixed manner, the first element is couplable to the fourth shaft in a rotationally fixed manner by the third shifting element, the third element is coupled to the third output shaft in a rotationally fixed manner, and the hybrid drive system includes exactly three shifting elements, which are the first shifting element, the second shifting element configured as a blocking shifting element, and the third shifting element.

17. The motor vehicle of claim 13, wherein the second element is coupled to a housing of the hybrid drive system in a rotationally fixed manner, the first element is coupled to the fourth shaft in a rotationally fixed manner, the third element is couplable to the third output shaft in a rotationally fixed manner by the third shifting element, and the hybrid drive system includes exactly three shifting elements, which are the first shifting element, the second shifting element configured as a blocking shifting element, and the third shifting element.

* * * * *